3,462,362
METHOD OF REVERSE OSMOSIS
Paul Kollsman, 100 E. 50th St.,
New York, N.Y. 10022
Filed July 26, 1966, Ser. No. 567,879
Int. Cl. B01d 13/00; C02c 1/00
U.S. Cl. 210—23                                5 Claims

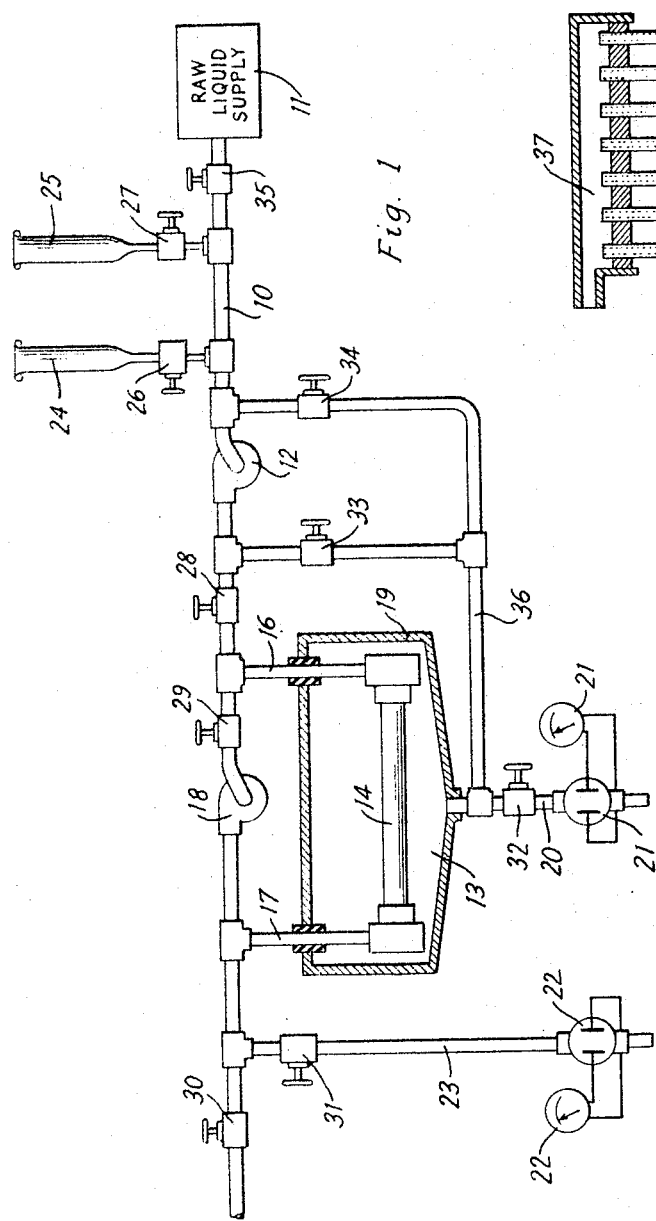
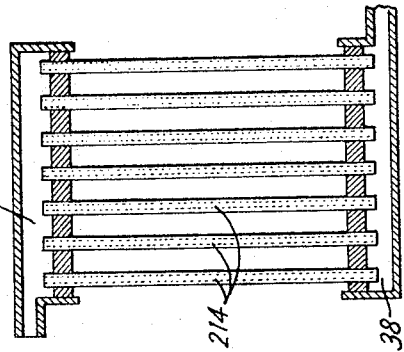
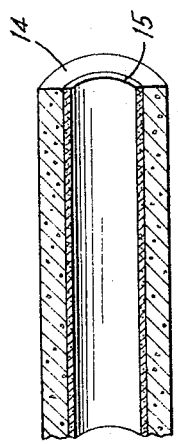
INVENTOR.
Paul Kollsman
BY Howard G Russell
his ATTORNEY United States Patent Office 3,462,362
Patented Aug. 19, 1969

ABSTRACT OF THE DISCLOSURE

The present improvements deal with the practice of treating an ionic feed solution by reverse osmosis employing a membrane structure comprising a porous substrate and a continuous and precipitated salt rejecting layer formed on the feed solution contacted surface side of the substrate by exposure of this surface, in succession, to a solution of polyelectrolyte containing fixed charges of predominantly one polarity, and then to another solution containing fixed charges of the opposite polarity. The membrane structure can be disintegrated by appropriate changes in ion concentration and pH of a flushing solution and can be redeposited in the aforesaid manner. The formed-in-place membrane is particularly suited for treatment of liquids of high organic content causing rapid fouling, such as sewage effluent.

This invention relates to the art of varying the ionic concentration of liquids by reverse osmosis and pertains to the method of separating an ionic solution into concentrate and dilute fractions, and to the formation and composition of an improved reverse osmosis membrane employed in the method and apparatus.

"Reverse osmosis" as used in this specification is characterized by the use of pressure in excess of osmotic pressure for the purpose of forcing a liquid fraction through a solvent/solute discriminating membrane. The reverse osmosis process is also sometimes referred to as "hyperfiltration."

In the specific application of reverse osmosis to water desalting, fresh water is preferentially forced through a salt rejecting membrane leaving on the near or upsteam side of the membrane a fraction whose salt concentration is increased by withdrawal of fresh water therefrom. Fresh water emerges from the far or upstream side of the membrane.

In the practice of reverse osmosis difficulties are experienced by the fouling of the membrane by impurities in the liquid passing therethrough. Membrane fouling or clogging generally necessitates disassembly of the apparatus and replacement of the membrane.

Also, conventional sheet-type membranes deteriorate because of hydrolysis and other reasons which are not yet fully understood. The membranes thus become either increasingly less selective with time or suffer a decrease in the liquid throughput rate and must then be replaced.

The costly disassembly of the apparatus and the replacement of the membranes has been a deterrent to economic application of reverse osmosis.

The invention provides an improved membrane which, unlike conventional sheet type membranes, is formed in situ from individual small particles preferably of the colloidal range up to 200 microns deposited in layers on a rigid porous support on which the membrane rests in order to be able to sustain the high pressure differential incident to the process or method. The porous support proper is of a sufficiently open structure so that the hydraulic pressure drop across it is small in relation to the pressure drop across the deposited layer. The porous support further provides a means for removing the desalted filtrate.

In one form of the invention the membrane consists of individual particles of polyelectrolyte material tightly packed together in the manner of a layer or filter cake and held in place either by reason of a high pressure differential on opposite surfaces of the deposited layer or by reason of a "salt-bridge" type bond between cationic and anionic polymers. Successive layers of smaller size particles may be deposited, superimposed upon one another, to obtain a smaller membrane pore size.

The membrane layer may be disintegrated and removed by an appropriate change in the pressure condition, for example by reduction of the pressure differential, or even its reversal. In the latter event the particles layer is lifted off its porous support by a flow of liquid passing through the support in a direction reverse with respect to the direction of normal operation. A membrane layer which coheres by reason of "salt-bridge" type bond may be disintegrated by destruction or weakening of that bond.

The removed membrane layer deposit may be re-established either by redeposition of the same particles or by deposition of new particles after the original particles are discarded.

The invention also makes it possible to form a reverse osmosis membrane on porous surfaces of complex shape and curvature as well as on surfaces which are poorly accessible or inaccessible mechanically, thus doing away with the need for the costly steps of disassembly and reassembly of the apparatus in the case of membrane failure or deterioration.

The convenience of redeposition of a reverse osmosis or hyperfiltration layer membrane in situ is an important feature of the invention. The ease of membrane renewal makes the process of this invention particularly useful for water desalination, or the purification of feed streams such as secondary sewage effluents, sugar solutions and polluted river water with high chemical oxygen demand (C.O.D.), all of which are highly contaminated with organic fouling agents.

The porous support for the membrane layer may have an infinite variety of shapes. For example, porous tubes of an extremely small internal diameter may be used, or tubes curved in the shape of a helix, spiral, or in zigzag formation, to increase their effective surface or to provide a predetermined spacing between surfaces. Such shapes would make it impractical, if not impossible, to place conventional sheet type membranes thereon. Even more difficult would be the removal and replacement of conventional membranes from, and on, such complex surfaces.

The novel membrane layer deposit can, of course, be formed also on conventional flat surfaces.

The invention takes advantage of the inherent property of polyelectrolyte materials, inorganic as well as organic, of being swellable and hence compressible and deformable. Under the applied high pressures the individual particles of the membrane layer deposit are not only packed tightly together, but deformed, so as to reduce their own pores as well as the interstices between the particles which would otherwise represent leakage passages.

An even more effective inter-particles seal may be formed by the use of a combination of particles of lesser compressibility with particles of higher compressibility, for example polymer particles of two different degrees of crosslinking.

The particles may also be coated with a polymer film, or a floc type sealer may be admixed to the liquid to be treated, which floc then flows into any existing interstices to seal them. The polyelectrolyte particles themselves may also be formed as floc.

The particle layer has a thickness of at least several particle diameters.

The particles proper may be of inorganic character such as montmorillonite, bentonite or other inorganic polyelectrolyte substances. Among the latter are hydrous mixed oxides and hydrous hydroxides. For example, mixed oxides such as $Al_2O_3/SiO_2$, $Al_2O_3/ZrO_2$ and $Sc_2O_3/ZrO_2$ are anion exchangers. Acid salts, products of hydrous oxides and acids are cation exchangers, for example zirconium phosphate. These are listed as ion exchange materials in the 1964 Saline Water Conversion Report, United States Department of the Interior. The particles may also be organic materials, such as the various strong base or strong acid ion exchange resins, for example quaternized or sulfonated polystyrene and the various weak base or weak acid resin polymers with amine or carboxyl groups. Suitable also are water swellable cellulose acetate substances which have the inherent property of resisting the passage therethrough of ions.

Relatively soft ion exchange materials are preferred in the practice of the invention because of their ready compressibility.

Softness and hardness of resinous ion exchange materials may be considered to be the result of two factors, the degree of crosslinking of the resin matrix and the amount of water, or other solvent, which the material is capable of containing, as a result of which the material then swells.

Weakly crosslinked resins with a relatively low content of polar groups for a given dry weight of the material produce particle layers of good salt, respectively solute, rejecting ability at relatively low operating pressures.

Weak acid and weak base resins are therefore suitable for the practice of this invention, as long as no material pH changes are encountered to which weak acid and weak base resins are sensitive in that a low pH solution causes a weak acid resin to shrink. A high pH has the same effect on weak base resins.

Strong acid and strong base resins are less affected by pH changes, but it was found that higher operating pressures are required to counteract their higher tendency to swell by reason of the greater hydrophilic nature of their polar groups.

The normally high swelling tendency of strong acid and strong base resins may be countered by providing in them polar groups for only a fraction, rather than all, of their monomeric units, the rest of their monomeric units being of a much less hydrophilic type, such as styrene, acrylonitrile, methyl methacrylate, etc.

For example, anion repelling resins of this type may be produced by copolymerization of a mixture of one part of an ester, such as ethyl ester of styrene sulfonate monomers, one or more parts of styrene monomers, and divinylbenzene in an amount equal to one-tenth to three percent of the total weight of both monomers, followed by hydrolysis of the sulfonic ester to sulfonate groups.

Cation repellant resins are similarly produced, except that the polar groups are amine or quaternary ammonium groups instead of sulfonate groups.

Such resins are commercial materials readily available in the trade, for example under the trade name "Amfion" applied to a copolymer of polyethylene and polystyrene sulfonated or quaternized to make the resin cation or anion exchanging, respectively. Styrene-divinyl benzene copolymer base ion exchange resins with various acidic and basic groups attached are known in the art under their trade names "Amberlite," "Duolite," "Dowex," etc.

The particles of the membrane layer deposit may also consist of regenerated cellulose treated to incorporate sulfonate, quaternary, or amine groups.

Carboxymethylcellulose of molecular weights between 30,000 and 500,000 may be crosslinked with formaldehyde or glyoxal and produces a soft water available material.

Another form of resin suitable as particles material may contain both cationic and anionic groups closely coupled to produce substantially mutual charge cancellations.

The resin exhibits a low ion exchange capacity in dilute saline water. resins of this type are disclosed in Colmon & Kressman "Ion Exchangers in Organic and Biochemistry," Interscience Publishers, New York 1957, page 25.

The particles layer is readily formed on the respective porous base by adding the particles in the form of a liquid suspension to the influent, a portion of which flows through the porous base, on opposite surfaces of which an appropriate pressure differential is established, for example 30 to 200 p.s.i. The particles are thus deposited on the porous surface and form a filter cake type layer.

The thickness of the deposit may be calculated from the volumetric amount of the dry particles and the porous area, taking into consideration whether all of the influent liquid is caused to pass through the porous base, or whether a portion is permitted to flow past the porous surface.

The thickness of the layer deposit may also be gauged by measuring the increase in flow resistance encountered, which may be expressed in terms of change of pressure differential to maintain a given flow rate across the porous surface.

Still another way of gauging the layer deposit is by measuring the change in ionic concentration of the liquid filtrate, for example the deionized product produced by its passage through the layer. In this case, particle suspension would be added to the influent until a certain degree of deionization is attained.

The removal of the particles layer is accomplished by reduction of the pressure differential on opposite sides of the porous base which loosens the deposit, accompanied by continued flow of liquid past the surface of the base on which the deposit rests, which flow then washes the particles away.

Particles which may have become wedged mechanically in the pores of the base can be removed by an appropriate change either in the ionic concentration or in the pH of the liquid, which change causes the particles to shrink.

Filter cake type layer deposits of either (a) anionic or (b) cationic particles or of (c) particles containing both anionic and cationic groups very closely spaced so as to produce charge cancellation therebetween, thus becoming essentially neutral in their reaction, produce dilute filtrate products and a corresponding ionic concentration in the liquid flowing past the layer deposit, by withdrawal of solvent from said liquid.

In many instances the solute rejecting property of relatively soft solvent swellable particles may be improved by a modification of the particles which involves coating them with a surface film, preferably adsorbed to the particle, of polymers, preferably linear polymers of a size sufficient to prevent entry of the polymer into the interior of the particles.

Thus, soft cation exchange particles may be coated with a film of a polymer comprising anion exchange groups, such as amminated or quaternized derivatives of polystyrene, or polymers of vinyl pyridine, methyl vinyl pyridine or their quaternized forms.

Anion exchange particles may be coated with a cation exchange film, such as polyacrylonitrile sulfate, copolymers of acrylic acid, or carboxymethyl cellulose. The film forming polymers preferably range in molecular weight between 1,000 and 10,000,000.

In this connection coating polymers of low water solubility, having weak acid or weak base ion exchange groups, or having fewer polar groups than total monomers in the chain, are preferred because they exhibit great stability in operation.

Filter cake type membrane deposits may additionally be modified by adsorption thereto of two or more successive layers, such as anionic followed by cationic polymeric layers. In this case the additional layers are adsorbed to one another. They form a very dense and very thin interfacial layer capable of efficient solute rejection without greatly reducing the flow rate.

The additional layer need not necessarily be adsorbed, but the superimposed layer may be of the same polarity as the layer on which it is placed and held by the pressure differential and the resultant liquid flow through the layers.

The membrane layer particles may also be floc particles precipitated from dilute solutions of anion polymers and cation polymers, respectively.

The polymers, separately soluble in water or in a mixture of equal parts of water and ethyl alcohol, cause mutual precipitation to water-insoluble flocs when mixed in equivalent quantities of both polymers. The floc particles are either solid or highly viscous and are preferably deposited as a layer immediately after precipitation. They normally exhibit a strong tendency to cling together.

The tendency of the floc particles to adhere together may be varied by a change of pH of the liquid in which they are suspended or by excess of polymer solution of one polarity, in which case the formed floc particles contain an excess of polymers of one polarity. As a result the floc particles have less tendency of adhering to one another.

By varying the ratio of the two polymers in solution and the manner in which they are precipitated on each other, flocs containing cationic polymers and anionic polymers in different ratio may be produced in various degrees of tackiness.

The polymers in the flocs may be weakly crosslinked to render them completely insoluble. Thus, for example, anionic polymers of carboxymethyl cellulose may be cross-linked by addition of and heating with formaldehyde, glyoxal and diisocyanates.

The objects, features and advantages of this invention will appear more fully from the detailed examples which follow and the description of a representative form of apparatus for carrying out the examples.

In the accompanying drawings:

FIG. 1 is a schematic drawing of an apparatus by means of which a filter cake type membrane layer according to the invention may be formed, modified, used for the process of reverse osmosis, and be removed;

FIG. 2 is a perspective view in section of a portion of a tubular reverse osmosis element comprising a cylindrical porous base or support member used in the apparatus of FIG. 1;

FIG. 3 shows a reverse osmosis element in the form of a helix; and

FIG. 4 shows, in part in section, a reverse osmosis element comprising a plurality of porous tubes.

In the description and in the claims various details will be identified by specific names for convenience. The names, however, are intended to be generic in their application. Corresponding reference characters refer to corresponding elements in the several figures of the drawings.

Referring to FIG. 1, a supply duct 10 extends from a source of raw liquid supply 11 to a pressure pump 12 whence the pressurized liquid flows into a reverse osmosis cell generally indicated as 13.

The cell comprises a microporous base 14 of sufficient structural strength to support an active solute/solvent discriminating layer deposited thereon against an operating pressure of several hundred p.s.i.

The microporous base 14 is shown in FIG. 1 in the very simple form of a straight tube, but, as will later be pointed out, a plurality of tubes may be employed and these may be straight, curved, helically wound or otherwise shaped with spaces between the tubes.

Suitable materials for the base are microporous inorganic ceramics, such as porcelain, and microporous synthetic organic resins. Their pore size may range from 0.01 to 100 microns, a preferred range being from 0.02 to 5 microns.

Resinous microporous materials are commercially available and are, for example, rigid polyvinyl chloride, polypropylene, polyethylene, polystyrene, polyacetals, epoxy, phenoxy or cellulose triacetate. These materials may be reinforced by fibers. The manufacture of porous bodies may proceed for example by admixing soluble, or leachable particles, such as a salt or starch to the plastic which is then formed into shapes, whereafter the salt or starch particles are removed by warm aqueous solutions or warm dilute sulfuric acid, respectively. Another method is to add foaming agents to the polymeric resins which generate finely divided gaseous regions during hot melt shaping of the respective tubes or shapes.

In the illustrated form of apparatus a cylindrical tube 14 of porous porcelain was used, on the interior surface of which (FIG. 2) a filter cake type membrane layer or layers 15 was deposited according to the invention.

It should be noted, however, that the direction of flow from the inside through the body of the tube to the outside was chosen for laboratory convenience. The layer or layers may also be deposited on the outside of the tube in which case the liquid flow is inward. The flow direction from outside to inside may be preferred in apparatus of a size for commercial production.

Returning to FIG. 1, two ducts 16 and 17 lead to, and from, the tube 14, respectively, and a circulating pump 18 is provided for the recirculation of liquid through the tube after an appropriate setting of various valves, later to be described.

Liquid filtrate passing through the wall of the tube 14 represents a first product fraction and is collected in an enclosing housing 19 and is drawn off through a withdrawal duct 20 within which a resistivity measurement unit 21 is arranged for the determination of the resistivity of the filtrate product.

A similar resistivity measurement unit 22 is installed in a withdrawal duct 23 through which a second product fraction is withdrawn.

Receptacles 24 and 25 are provided for successively feeding liquids such as particle suspensions or solutions into the supply duct 10, for example for the formation of the filter cake membrane or a subsequent treatment of it.

Valves 26 and 27 control the admission of liquids from the receptacles 24 and 25 and other valves 28 through 33 are provided for the purpose of producing various flow conditions as follows:

During normal reverse osmosis operation raw liquid is directed through open valves 35, 28 into the unit 13 and product flows are withdrawn through open valves 31 and 32. Drain valve 30 is closed. Circulation valve 29 may be open or closed, depending on whether a recirculation flow through 14 is desired.

If the polyelectrolyte particles of the layer 15 are to be discarded after removal, product valves 31 and 32 are closed and the drain valve 30 is opened.

If the layer deposit 15 is to be removed by backflushing, valve 28 is closed and pressurized liquid is admitted through open valve 33 through a duct 36 in the housing 19. Prior to such admission of pressure fluid additives may be admitted into the housing 19 through open valve 34 from receptacles 24 or 25. During backflushing the valve 28 remains closed.

As previously indicated, the porous element or base which supports the layer 15 may have a wide variety of shapes. FIG. 3 shows a tubular element wound in the shape of a helix 114. In FIG. 4 a plurality of tubular elements 214 are mounted between headers 37 and 38, similar to the construction of a tube-and-shell type heat exchanger.

Tests were conducted in an apparatus constructed essentially as shown in FIG. 1 and comprising a porous porcelain tube of 10 mm. inner diameter, 20 cm. length and an average pore size of the order of 1 micron.

The raw or untreated water used in the examples was saline water of a resistivity of 990 ohms-cm.

The raw water was supplied at the pressures stated below, and the flow volumes were so adjusted as to maintain the volumetric rate of the dilute filtrate, i.e., the water passing through the porous tube wall equal to the rate of the concentrate remaining after flow through the interior passage of the tube, i.e., past its porous wall.

The water was recirculated at the rate of 5 cm./sec. so as to flow through the interior tube passage repeatedly.

The resistivity of the concentrate and dilute products were determined by conductivity cells.

In order to facilitate the addition of the polyelectrolytes to the circulated stream while being deposited onto the porous base in the following examples, a dilute aqueous low viscosity solution was prepared of the respective polyelectrolyte.

For low molecular weight polyelectrolytes or cross-linked colloidal particles concentrations of the order of 0.01 to 1 percent was used.

For high molecular weight viscous material, such as the partially sulfonated polyacrylonitrile of 8,000,000 molecular weight, it is was necessary to us a 0.05 to 0.3 percent concentration so that the viscosity of the solution remained sufficiently low to permit ready dispersion into the feed stream. In all instances the viscosity was below 1000 centipoise.

EXAMPLE 1

An aqueous suspension of layer-forming particles was prepared as follows:

Commercially available polystyrene sulfonate ion exchange resin beads crosslinked with 1/3 % of divinyl benzene, possessing an ion exchange capacity of about 1.4 milliequivalents per gram of dry resin were reduced in a colloidal mill to a particle size ranging from 1 to 4 microns.

The resulting colloidal size particles were mixed with water to produce a suspension of a concentration of one-tenth of one percent. The slightly crosslinked resin particles are highly swollen and readily deformable.

(A) The raw water was supplied to the reverse osmosis unit at a pressure sufficient to produce a pressure differential of 200 p.s.i. between the inside and the outside of the porous tube.

The aqueous suspension was gradually added to the raw water feed stream of 990 ohms-cm. resistivity, resulting in an increase of the resistivity of the filtrate to 2450 ohms-cm., whereupon the addition of suspension was discontinued.

After 2 hours of operation the resistivity rose to 2690 ohms-cm.

An additional volume of particle suspension was added raising the resistivity to 3010 ohms-cm., but at a steadily decreasing rate of change. After 3 further hours of operation the resistivity of the filtrate became 3160 ohms-cm.

The differential was then raised to 400 p.s.i., yielding an even more highly deionized filtrate product of 3640 ohms-cm.

(B) The supply of raw water was then discontinued causing the pressure differential inside and outside the tube substantially to equalize while continuing the recirculation of the liquid through the passage of the porous tube. This caused the deposited layer of ion exchange particles to be disturbed and the particles to go back into suspension as ascertainable by draining a sample of the suspension.

(C) Reestablishment of differential pressure of 200 p.s.i. caused redeposition of the particles layer on the porous tube. Subsequent increase of the pressure differential to 400 p.s.i. produced a filtrate of 3470 ohms-cm.

(D) The particles layer was then removed by backflushing, i.e., reversal of the liquid flow through the pores from the outside to the inside at 200 p.s.i. It appeared that the removal is speeded by an increase in the salinity of the backflushing water to 1 N NaCl.

Comments: It appears reasonable to ascribe the increased salt rejecting property of the deposited particles layer to either a decrease in the size of the intersticial passages between the particles or to a decrease in the size of the internal pores of the particles, or both, resulting from the tight packing together of the particles which are deformable per se.

Further, the more efficient removal of the particles of the layer under a condition of higher ionic concentration of the ambient liquid may be due to shrinkage of the particles under this condition, facilitating removal of particles from passage portions of the porous tube in which they were lodged under the high operating pressure.

Summarizing, the test establishes that it is practical to deposit, remove and redeposit a solute/solvent discriminating active reverse osmosis layer or membrane in the form of individual particles without mechanical access to the surface of the porous layer supporting base which may be of complex configuration.

EXAMPLE 2

An aqueous suspension of one-tenth of one percent concentration was prepared of 250 mg., dry weight, of a commercial grade of chloromethylated and quaternized polystyrene resin of 1.3 milliequivalents ion exchange capacity crosslinked with 0.16% divinylbenzene. The resin was obtained in bead form and the beads were reduced to a particle size of 1 to 4 microns in a colloidal mill.

The suspension was fed into the porous tube under 50 p.s.i. pressure and recirculated until substantially all of the particles had settled as a filter cake layer on the interior tube wall. During the period of deposit the sole outflow from the tube was through the pores.

Raw water of 990 ohms-cm. resistivity was then supplied at a pressure differential of 200 p.s.i. and the flows adjusted to produce twice as much filtrate as concentrate.

Result: The filtrate was deionized to an extent to increase its resistivity to 3090 ohms-cm., a 3.1 to 1 reduction of ion content.

Backflushing at 200 p.s.i. with 2 N NaCl solution removed the filter cake layer completely.

Comment.—The anion exchange particles layer thus produced possesses substantial salt rejecting properties and is readily deposited as well as removed. The strongly basic particles cling well to the weakly acidic porous base.

EXAMPLE 3

An aqueous suspension was prepared of 500 mg., dry weight, of montmorillonite of up to one micron particle size, and 100 mg. of African blue asbestos fibres.

The suspension was fed into the porous tube and recirculated therethrough at the rate of 5 cm./sec. under a pressure of 20 p.s.i. The sole outflow from the tube was through its porous walls.

After deposit of the montmorillonite layer on the interior tube wall raw water of 990 ohms-cm. resistivity was supplied under a pressure differential of 200 p.s.i. and the filtrate flow maintained at twice the rate of the concentrate flow. Resistivity of the filtrate 1680 ohms-cm.

Reverse flushing with raw water removed most of the montmorillonite particles, and an increase in the salinity to 1 N NaCl removed all remaining minor amounts from the porous base.

In a repetition of the example water was used for backflushing, first at pH 4 followed by water of pH 9. This procedure also removed all traces of particles.

Comment.—In this example a weakly acidic inorganic highly swellable polyelectrolyte material produced a filter cake type membrane layer of moderate salt rejecting properties.

EXAMPLE 4

A montmorillonite layer was deposited as in Example 3. Then 12 mg., dry weight of chloromethylated and quaternized polystyrene of about 30,000 molecular weight was added to the influent in the form of an aqueous solution. After 6 hours of operation at 600 p.s.i. the resistivity of the filtrate increased to 3320 ohms-cm. from 990 ohms-cm.

Reverse flushing with 3 N NaCl solution removed the entire deposit completely.

Comment.—The increase in the effectiveness of the salt rejecting layer is believed to be due to the formation of a skin or film of strongly basic character and smaller pore size on the weakly acidic montmorillonite particles forming an intermediate support layer. The strongly basic organic polymers are believed to be adsorbed to the oppositely charged particle surfaces. The organic polyelectrolyte coating may also be effective in reducing the interstices between the particles, thus reducing leakage of the concentrate into the filtrate.

The surface of the filter cake type membrane layer had the character of a strong base anion exchanger which inherently is cation repellant.

EXAMPLE 5

A montmorillonite layer was deposited as in Example 3. Then 12 mg., dry weight, of vinyl pyridine of a molecular weight ranging between 2,000 and 41,500 was added to the influent in the form of an aqueous solution. The montmorillonite layer thus treated produced a filtrate of 3770 ohms-cm. at 600 p.s.i. from the raw water feed of 990 ohms-cm.

Comment.—This example confirms that a polymer film adsorbed to the exposed surface of the particle layer improves its performance as a reverse osmosis membrane layer.

EXAMPLE 6

A montmorillonite layer was deposited as in Example 3. An aqueous solution was prepared of 10 mg. of polyacrylonitrile of a molecular weight of 8,000,000 having sulfonate groups attached to every third of its monomers. This solution was added to the influent. The montmorillonite layer thus treated produced a filtrate of 2990 ohms-cm. at 200 p.s.i. The layer was readily removable by reverse flushing with alkaline aqueous solution.

Comment.—The salt rejecting property of a montmorillonite layer, weakly acid in itself, is improved by the treatment with strongly acid cation exchange polymer solution. The improvement is believed to be due primarily to the reduction of the spaces between the particles by the polymer. The use of alkaline reverse flush solution helped to remove the deposited membrane.

EXAMPLE 7

A montmorillonite layer was deposited as in Example 3. A solution was then prepared of 12 mg., dry weight, of quaternized polychloromethylstyrene of a molecular weight of 30,000. This solution was added to the feed stream, and after 30 minutes of recirculation sufficient for the deposition of the quaternized polychloromethylstyrene, a second aqueous solution of 8 mg., dry weight, of partially sulfonated polyacrylonitrile of 8,000,000 molecular weight, 8 mg. of polystyrene sulfonate of a molecular weight of 30,000, and 8 mg. of polystyrene sulfonate of a molecular weight of 2,000 with sulfonate groups attached to every third monomer was added to a feed stream of secondary sewage effluent of 1200 ohms-cm. resistivity.

The pressure differential was then increased to 1000 p.s.i. After establishment of an equilibrium condition, the resistivity of the filtrate was found to be 8800 ohms-cm. Substantial removal of the chemical oxygen demand (C.O.D.) was observed by permanganate filtration.

Reverse flushing with 3 N NaCl solution removed the filter cake layer completely from its porous porcelain support.

Comment.—In this example the weakly acid montmorillonite particle layer had a strongly basic film deposited on it followed by a strongly acidic deposit. The membrane-layer deposit exhibited strongly acid surface properties and good salt rejection characteristics. It is postulated that acid-base interaction between successive layers of oppositely charged polyelectrolytes forms a superthin continuous interfacial layer of small pore size, thus providing good salt rejection efficiency while retaining a satisfactory liquid throughput rate.

EXAMPLE 8

A montmorillonite layer was deposited as in Example 3. The deposit was then treated by adding an aqueous solution of 12 mg., dry weight, of quaternized polychloromethylstyrene of a molecular weight of 30,000 to the feed stream, followed by 30 minutes of recirculation to insure the deposition of the polymers. A second aqueous solution was then prepared of 15 mg., dry weight, of the acid form of carboxymethyl cellulose polymers of molecular weights ranging from 10,000 to 50,000. This second solution was then added to the feed stream for adsorption on the treated strongly basic layer, producing a weakly acid polymer surface. The filtrate produced by this compound layer-deposit of a differential pressure of 800 p.s.i. had a resistivity of 4140 ohms-cm.

EXAMPLE 9

A montmorillonite layer was deposited on the porous porcelain base as in Example 3. On this layer a plurality of basic and acidic polymer films were then deposited in alternating sequence as follows: Each film deposit was produced by an aqueous solution of 12 mg. of the respective polymer in the following sequence:

The first, third, fifth and seventh film of quaternized polychloromethylstyrene of a molecular weight of 30,000. The second, fourth, sixth film of sulfonated polyacrylonitrile of a molecular weight of 8,000,000. The eighth film of 12 mg. of sulfonated polyacrylonitrile of a molecular weight of 8,000,000 and 12 mg. of polystyrene sulfonate of molecular weights ranging between 2,000 and 30,000.

The resistivity of the filtrate produced at 200 p.s.i. was 4290 ohms-cm.

Reverse flushing with 3 N NaCl solution and 1 N NaOH removed the composite filter cake membrane deposit from the porcelain base.

EXAMPLE 10

A quaternized polychloromethylstyrene layer was deposited on the porous porcelain base as in Example 2.

On this layer was then deposited a film produced from an aqueous solution of 12 mg. of carboxycellulose polymers of molecular weights ranging between 10,000 and 50,000.

Operation at 200 p.s.i. produced a filtrate of 3900 ohms-cm. resistivity.

Reverse flushing with 2 N NaCl solution removed the membrane deposit from its porous base.

Comment.—The improved result, as compared with Example 2, appears to be due to an adsorption of a polymer film to the polystyrene particles and possibly to a reduction of the interstices between them. The strongly basic particles cling to the weakly acidic base, and the exposed surface of the film coated layer was weakly acidic.

EXAMPLE 11

Chloromethylated and quaternized polystyrene resin beads of 1.3 milliequivalents ion exchange capacity, crosslinked with 0.16% divinylbenzene were reduced to colloidal particle size of between 0.2 and 4 microns in size.

250 mg., by dry weight, of the colloidal particles were precoated with a film of adsorbed polystyrene sulfonate ranging in molecular weight from 2,000 to 10,000 by immersion of the polystyrene particles in a solution of one part of dry polystyrene sulfonate in 1,000 parts of water, followed by washing of the coated particles in water.

The precoated particles were deposited inside the porous porcelain tube by feeding an aqueous suspension into the tube under 50 p.s.i. pressure differential and recirculation until the particles had settled out.

The treatment of raw water of 990 ohms-cm. resistivity at 200 p.s.i. pressure differential produced a filtrate of 3940 ohms-cm., the flow ratio being adjusted to produce twice as much filtrate as concentrate. The result was superior to that of Example 2, the polystyrene film coating accounting in all probability for the improvement. The filter cake membrane deposit had anion repellant characteristics.

EXAMPLE 12

Chloromethylated and quaternized polystyrene particles crosslinked with 0.16% divinylbenzene and of a particle size between 1 and 4 microns as used in Examples 2 and 11 were precoated by immersion in an aqueous solution of polymers of carboxymethyl cellulose of a molecular weight of 10,000, there being 4 parts, dry wieght, of polymer in 1,000 parts of water producing a strongly adsorbed polymer film or coating on the polystyrene particles which were then washed in water.

The precoated particles were deposited inside the porous porcelain tube by feeding an aqueous suspension into the tube under 50 p.s.i. pressure differential as in Example 11.

The filtrate produced under 200 p.s.i. pressure differential had a resistivity of 4020 ohms.-cm.

EXAMPLE 13

Example 2 was repeated with a modified quaternized polystyrene resin mixture composed of equal parts of resin of 0.16% and 2% crosslinking.

The produced filtrate had a resistivity of 3330 ohms-cm.

Comment.—The improvement is ascribed to the fact that particles of two different degrees of compressibility form a tighter filter cake membrane deposit, hence reduce liquid leakage through the interstices between the particles.

EXAMPLE 14

500 mg. of montmorillonite particles were deposited on the porcelain base.

An aqueous solution was prepared by dissolving 6 mg., dry weight, of polystyrene sulfonate of a molecular weight of 30,000 and an ion exchange capacity of 1.4 milliequivalents per gram in 6 cc. of water.

A second aqueous solution was prepared by dissolving 6 mg., dry weight, of polyvinyl pyridine quaternized by alkylation with methyl bromide of a molecular weight of 30,000 and an ion exchange capacity of 1.3 milliequivalents per gram in 6 cc. of water.

Both suspensions were simultaneously, gradually and separately fed into the raw water stream so as to insure further dilution of the additives before the then occurring reaction between the polystyrene sulfonate and the quaternized polyvinyl pyridine, producing a floc which then settled on the montmorillonite layer.

Operation under a pressure differential of 200 p.s.i. produced a filtrate of 3590 ohms-cm. resistivity. The filter cake membrane layer was readily removable by back-flushing with a 3 N NaCl and 1 N NaOH solution.

Comments.—The floc appears to operate as a sealant for the intersticial spaces between the particles, reducing leakage and improving the degree of deionization of the filtrate product.

Comment.—After deposit of the floc on the montmorillonite layer, the montmorillonite becomes substantially ineffective as a solute/solvent discriminating layer, but the active layer is then the floc deposit.

The montmorillonite underneath the floc then performs a substantially mechanical function. It acts as a so-called filter aide which is a layer of sufficiently fine porosity to prevent particles deposited thereon, namely the floc particles, from passing into the coarser pores of the base. In a sense, the montmorillonite layer becomes a mechanical portion of the base.

This was confirmed by using a layer of diatomaceous earth in the place of montmorillonite which produced comparable results.

EXAMPLE 15

Dried carboxymethyl cellulose of a molecular weight between 30,000 and 50,000 with a degree of substitution of 0.5 was modified by acetylation with acetic anhydride and sodium acetate to a degree to be water insoluble at pH 8, but to be soluble in water made alkaline to pH 12.5 by addition of NaOH. Thus modified the carboxymethyl cellulose was also soluble in a mixture of equal volumes of ethyl alcohol and water.

A suspension of 200 mg. of particles of diatomaceous earth was added to the feed water flowing to the porous tube (14) and was recirculated (pump 18) at a rate of 5 cm./sec. under a pressure differential of 20 p.s.i. on opposite sides of the tube wall.

After deposition of the particles layer a solution of 40 mg. of the modified carboxymethyl cellulose in 40 cc. of water was made alkaline to pH 12.5 by addition of NaOH and added to the feed water.

The filtrate was fed back into the feed water supply line (through duct 36 and valve 33) for recirculation through the particles layer (on tube 14). Then an aqueous solution of 0.1 N HCl was introduced into the recirculating stream in an amount sufficient to reduce the pH to 6 over a period of 15 minutes.

The differential pressure was then increased to 200 p.s.i. and saline feed water supplied of a resistivity of 990 ohms–cm. After an equilibrium condition was established the resistivity of the filtrate was 3,220 ohms–cm.

Reverse flushing with feed water made alkaline by addition of NaOH to pH 12.5 removed the particles layer completely.

Comment.—It appears that a salt rejecting layer of carboxymethyl cellulose particles was formed by precipitation from a solution by a change in pH of the solution.

EXAMPLE 16

After deposition of the particles layer of Example 15 a solution of 1% cane sugar in water was used as a feed liquid. The filtrate had a sugar content of 0.09%.

Innumerable polyelectrolyte combinations are suitable for the practice of this invention.

Among the preferred polyelectrolytes are:

Layers formed of polyacrylic acid (or 50%–50% copolymer with hexyl acrylate) with polyvinyl pyridine (or its alkylated form).

Layers formed of polymethacrylic acid copolymer with styrene and copolymers containing 10% or more of N,N diethylaminoethyl methacrylate (weak base).

A layer of polyaminostyrene.

No attempts were made to obtained optimum condition by varying the several variables in the examples. Rather, the purpose of the examples was to establish qualitative operativeness.

What is claimed is:

1. In the method of producing from an ionic liquid a product fraction of reduced ion content by reverse osmosis, the improvement which comprises, depositing on one surface of a porous substrate a microporous layer of particles, contacting said layer from the exposed surface thereof by a first solution of polyelectrolyte containing an excess of fixed charges of one polarity, then contacting said layer from said exposed surface by a second solution of polyelectrolyte containing an excess of fixed charges of the opposite polarity resulting in the formation on said layer of a continuous interfacial precipitated film possessing ion rejecting properties, passing said ionic liquid through said film, layer and substrate by a hydrostatic pressure in excess of the osmotic pressure in relation to the product fraction, thereafter exposing said film to a third ionic solution of an ionic concentration sufficiently high to dissociate the ionic bond between the anionic and cationic polymers of said film and disperse said film; flushing said layer from said substrate; redepositing a like particle layer on said substrate, and then forming a like interfacial precipitated film on the exposed surface of said last named layer.

2. The method according to claim 1 in which said substrate is tubular and formed in the shape of a helix.

3. The method according to claim 1 in which said substrate is tubular and formed in the shape of a helix, said layer being deposited on the tube inside.

4. The method according to claim 1 in which said first, second and third solutions are aqueous solutions.

5. In the method of recovering water of reduced salt content and organic content from sewage effluent by reverse osmosis comprising passing the effluent through the wall of a porous tubular body, the improvement which comprises, depositing on the influent surface of said body a layer of particles of an average diameter of the order of a micron; contacting said layer from the exposed surface thereof by a first solution of a polyelectrolyte containing an excess of fixed charges of one polarity; then contacting said layer from the exposed surface thereof by a second solution of polyelectrolyte containing an excess of fixed charges of the opposite polarity resulting in the formation on said layer of a continuous interfacial precipitated film possessing ion rejecting properties; exposing said sewage effluent to said film while simultaneously applying to said effluent a hydrostatic pressure in excess of the osmotic pressure with respect to purified water to drive the water component of said effluent through said film, layer and body; then exposing said film to a third ionic solution of a concentration sufficiently high to dissociate the ionic bond between the anionic and cationic polymers of said film and subjecting said film and layer to a flow of liquid substantially to remove the layer from the substrate; and then depositing a like particle layer on said body and a like interfacial precipitated film on said last named layer.

References Cited

UNITED STATES PATENTS

| | | | |
|---|---|---|---|
| 3,276,598 | 10/1966 | Michaels et al. | 210—500 |
| 3,283,813 | 11/1966 | Brownscombe et al. | 166—9 |
| 3,291,730 | 12/1966 | Martin | 210—22 |
| 3,342,729 | 9/1967 | Strand | 210—23 |
| 3,344,928 | 10/1967 | Kraus et al. | 210—500 |
| 2,041,763 | 5/1936 | Heckman | 210—503 |
| 2,832,473 | 4/1958 | Oberholtzer | 210—75 |
| 2,952,363 | 9/1960 | Griswold | 210—193 |
| 3,331,772 | 7/1967 | Brownscombe et al. | 210—23 |
| 3,367,787 | 2/1968 | Thijssen et al. | 210—22 X |
| 760,364 | 5/1904 | Woolworth | 210—502 X |
| 2,960,462 | 11/1960 | Lee et al. | 210—321 X |
| 3,009,578 | 11/1961 | Foote et al. | 210—500 X |
| 3,022,187 | 2/1962 | Eyraud et al. | 55—158 X |
| 3,083,118 | 3/1963 | Bridgeford | 117—47 |
| 3,242,073 | 3/1966 | Guebert et al. | 210—75 X |
| 3,250,703 | 5/1966 | Levendusky | 210—75 X |
| 3,250,704 | 5/1966 | Levendusky | 210—75 X |
| 3,331,772 | 7/1967 | Brownscombe et al. | 210—22 X |

FOREIGN PATENTS 262,131   5/1927   Great Britain.

OTHER REFERENCES

Saline Water Conversion Report for 1964, prepared by the U.S. Dept. of Interior, Office of Saline Water, placed on sale July 14, 1965, pp. 37–39, 46–48, 107–109, 172, 173, 98 and 99 relied on.

REUBEN FRIEDMAN, Primary Examiner

F. A. SPEARS, JR., Assistant Examiner

U.S. Cl. X.R.

210—321